No. 641,441.  
J. C. DUIGAN.  
MILKING DEVICE.  
(Application filed Oct. 28, 1899.)  
Patented Jan. 16, 1900.

(No Model.)

WITNESSES:  
Ella L. Giles

INVENTOR  
John Charles Duigan  
BY Richardson  
ATTORNEYS

THE NORRIS PETERS CO., PHOTO-LITHO., WASHINGTON, D. C.

UNITED STATES PATENT OFFICE.

JOHN CHARLES DUIGAN, OF MELBOURNE, VICTORIA.

MILKING DEVICE.

SPECIFICATION forming part of Letters Patent No. 641,441, dated January 16, 1900.

Application filed October 28, 1899. Serial No. 735,085. (No model.)

*To all whom it may concern:*

Be it known that I, JOHN CHARLES DUIGAN, pastoral agent, of No. 82 William street, Melbourne, in the Colony of Victoria, have invented certain new and useful Improvements in Milking Appliances, of which the following is a specification.

This invention has been devised for the purpose of providing certain improvements in connection with appliances used for milking cows and like animals, and by the use of which said improvements dust, odors, and germs are prevented from attacking or entering the milk coming from the cow or into the milk pail or receptacle into which the fluid is milked.

In order to make the invention clear, I will now refer to the accompanying sheet of drawings, in which—

Figure 1:
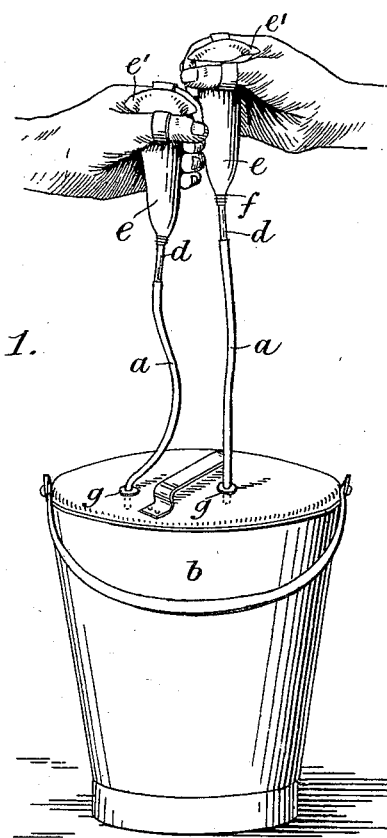
Figure 2:
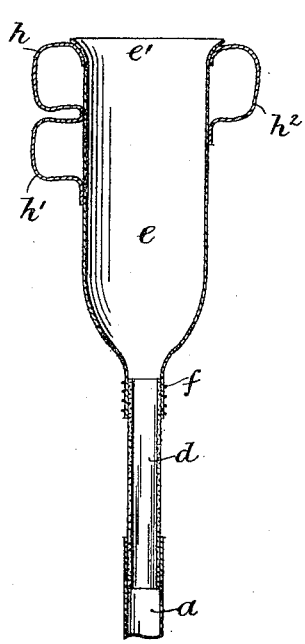
Figure 3:
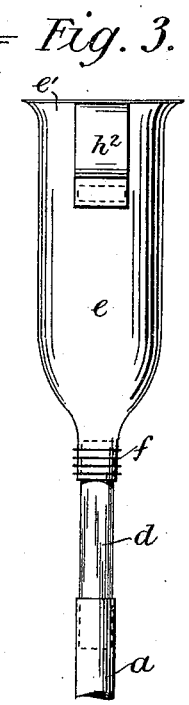

Figure 1 shows a view of the complete appliances as used; Fig. 2, an enlarged vertical section taken through the pouch or bag and its connections; Fig. 3, an enlarged elevation of the parts shown in Fig. 2 looking onto the thumb-stall.

In the drawings, $a$ represents a rubber or other flexible tube which enters a hermetically-sealed can or receptacle $b$ through a closely-fitted orifice. This tube has a washer $g$ near its end and which closes the orifice. The tube should be about two feet six inches in length, and is provided at its top end with a short length of glass tubing $d$ and upon which it is fitted. The top of this short piece of glass tubing enters the bottom of a specially-constructed bag or pouch $e$, that is preferably made of rubber or leather, vulcanized or otherwise treated to make it impervious, and is about six inches in length by about three inches in diameter and flared or bell-mouthed at its top $e'$ and tapering near its bottom, so that its end terminates in tube form, and which is set around (or alternatively into) the top of the small glass tube $d$, hereinbefore referred to, and in which position it is secured by wire $f$ or by other suitable means. The pouch or bag is large enough to receive the teat of the cow, so that when in operation the teat will be inside the bag. Around and outside of the bag and near its top are loops $h\ h'\ h^2$, (see Fig. 2,) preferably two on one side and one on the other, which form finger-stalls and are so arranged that the fingers and thumb of the hand of the milker may grasp the bag and inside it the teat, so as to perform the work of milking.

I do not confine myself to any particular material for the construction of the bag hereinbefore referred to, as the same might be formed of any thin and flexible fabric or waterproof material; but in any case its texture should be such as to prevent any leakage of milk and also to prevent the ingress of any minute germs or odors from the byre to the stream coming from the cow or downward into the closed pail or receptacle $b$. The proportions of the bag which I have above given are only approximate and may be increased or diminished according to requirements. When formed of leather or fabric, the bag will be constructed, preferably, of two pieces cut to the required form and sewed together. The number of stalls for the fingers may be varied to suit requirements, these being sewed on or otherwise secured in position.

Two of the pouches would ordinarily be employed—one for each hand—in the operation of milking, as illustrated in Fig. 1, the glass tube $d$ forming an indicator as to the flow of milk.

The bag and tubing should after being used be well washed and scoured and preferably be kept or rinsed in some antiseptic and odorless solution, liquid, or material, so as to prevent any germ life or acidity collecting either in the bag, its interstices, or the tubing, the object being to keep the bag and tubing both soft and sterilized. I have found a weak solution of boracic acid or of permanganate of potassium to be very suitable for the purpose.

Having now particularly described and ascertained the nature of my said invention and in what manner the same is to be performed, I declare that what I claim is—

1. A teat-cup comprising a flexible bag and finger-loops arranged longitudinally thereof.

2. A teat-cup comprising a flexible bag and finger and thumb loops arranged longitudinally thereof on opposite sides of the same, substantially as described.

Signed at Melbourne, Victoria, this 26th day of September, 1899.

JOHN CHARLES DUIGAN.

Witnesses:
A. O. SACHSE,
A. MCCOWAN.